(12) United States Patent
Lamanna et al.

(10) Patent No.: US 8,519,980 B2
(45) Date of Patent: Aug. 27, 2013

(54) METHOD AND APPARATUS FOR DETERMINING CONTACT AREAS WITHIN A TOUCH SENSING REGION

(75) Inventors: James Lamanna, Los Angeles, CA (US); Russel Howe, Montrose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 357 days.

(21) Appl. No.: 12/857,436

(22) Filed: Aug. 16, 2010

(65) Prior Publication Data

US 2012/0038589 A1 Feb. 16, 2012

(51) Int. Cl.
*G06F 3/042* (2006.01)
*G09G 5/08* (2006.01)

(52) U.S. Cl.
USPC .......................................... 345/175; 345/163

(58) Field of Classification Search
USPC .......................................... 345/163, 175, 178
See application file for complete search history.

(56) References Cited

U.S. PATENT DOCUMENTS

| | | | |
|---|---|---|---|
| 4,144,449 A | 3/1979 | Funk | |
| 6,587,099 B2 | 7/2003 | Takekawa | |
| 6,943,779 B2 | 9/2005 | Satoh | |
| 7,034,809 B2 | 4/2006 | Hasegawa | |
| 2002/0145595 A1* | 10/2002 | Satoh | 345/173 |
| 2007/0222795 A1* | 9/2007 | Heim et al. | 345/621 |
| 2008/0211779 A1 | 9/2008 | Pryor | |
| 2009/0109195 A1 | 4/2009 | Kent et al. | |

\* cited by examiner

*Primary Examiner* — Michael Faragalla
(74) *Attorney, Agent, or Firm* — Michael Johnson (57) ABSTRACT

The invention determines the location of multiple, simultaneous contact areas on a touch sensing region using a light source and several light detectors. The invention is robust against occlusion and many of the ambiguities that can arise with multiple, simultaneous contact areas. Generally, the light source is positioned such that light emanating the light source passes across the touch sensing region, and the light detector are positioned such that at least a portion of the light source is within the field of view of each light detector. The contact areas are determined by identifying positive fans corresponding to an angular sector of the field of view of a light detector in which the view of the light source is occluded and negative fans corresponding to an angular sector of the field of view of a light detector in which the view of the light source is not occluded. The positive fans and negative fans are then additively and subtractively combined, respectively, to determine the contact areas.

21 Claims, 11 Drawing Sheets

METHOD AND APPARATUS FOR DETERMINING CONTACT AREAS WITHIN A TOUCH SENSING REGION

BACKGROUND

1. Technical Field

The invention relates to touch detecting interactive displays. More particularly, the invention relates to methods and systems for determining the areas at which a user contacts a touch-detecting interactive display.

2. Description of the Prior Art

Many common tasks require one or more individuals to interactively explore information presented on a display. For example, a team of paleontologists may wish to discuss an excavation plan for a remote dig site. To do so, they wish to explore in detail the geographic characteristics of the site as represented on digitized maps presented on a display. Traditionally, this required the team to either huddle around a single workstation and view maps and images on a small display or sit at separate workstations and converse by phone. Collaborative exploration of the imagery is much more easily accomplished with the users surrounding a single large display. A particularly effective device is a touch detecting, interactive display, such as that disclosed in the referenced patent filing entitled "Touch Detecting Interactive Display".

Figure 1:
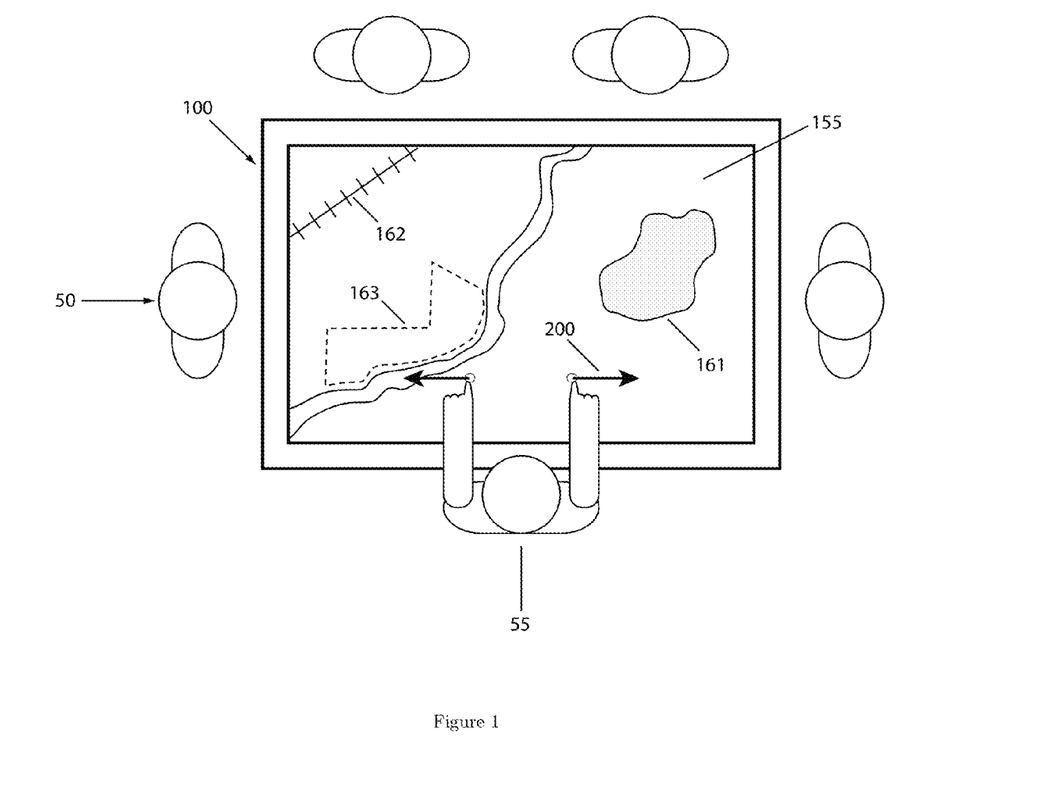
FIG. 1 shows several users operating a touch-detecting interactive display.

FIG. 1 shows several users operating a touch-detecting interactive display. The users 50 surround the display 100 such that each can view the display surface 150, which shows imagery of interest to the users. For example, the display may present Geographic Information System (GIS) imagery characterized by geographic 161, economic 162, political 163, and other features, organized into one or more imagery layers. Because the users can comfortably surround and view the display, group discussion and interaction with the display is readily facilitated.

Generally corresponding with the the display surface is a touch sensing region 155 monitored by a touch sensor capable of detecting when and where a user touches the display surface. Based upon the contact information provided by the touch sensor, user gestures are identified, and a command associated with the user gesture is determined. The command is executed, altering the displayed imagery in the manner requested by the user via the gesture. For example, in FIG. 1, a user 55 gestures by placing his fingertips on the display surface and moving them in an outwardly separating manner. In response, a zoom gesture is identified, and the imagery on the display is magnified.

A number of touch sensor technologies, operating on a variety of principles, have been proposed for detecting contacts within the touch sensing region. In one approach, a resistive touch pad is placed beneath a flexible display surface. The resistive touch pad comprises two layers of plastic that are separated by a compressible insulator such as air, and a voltage differential is maintained across the separated layers. When the upper layer is touched with sufficient pressure, it is deflected until it contacts the lower layer, changing the resistive characteristics of the upper to lower layer current pathway. By considering these changes in resistive characteristics, the location or locations of the contact can be determined. In another approach, surface acoustic waves (SAWs) passing above the surface of the touch sensing region are absorbed and reflected when a user contacts the display. Acoustic sensors analyze the altered sound field to determine the contact location or locations.

More commonly used are capacitive technologies, in which the touch sensing region is coated with a transparent conductor (e.g. indium tin oxide (ITO)). Contacting the coating with another conductor (e.g. a human finger or hand) induces a change in capacitance. In surface capacitance sensors, measurements of the capacitance at points on the perimeter of the touch sensing region allow the location of the contact to be determined. In projected capacitance sensors, a insulating grid is etched into the conductive coating, allowing for a grid of localized capacitance measurements and therefore improved accuracy in the determination of the contact location or locations.

The above touch sensor technologies, however, are not easily scaled to the very large display sizes that are desirable for use in the multi-user, collaborative scenario illustrated in FIG. 1. Moreover, manufacture of the touch sensor is both costly and deeply integrated with the manufacture of the display—the touch sensor cannot be easily retrofit to conventional displays.

Optical imaging system provide increased scalability, affordability, and versatility. Such systems typically incorporate one or more of light sources, light detectors, and retroreflectors arrayed on the perimeter of the touch sensing region. The touch sensor determines a contact area by analyzing the occlusion or reflection of light induced by objects (e.g. a human finger or hand) contacting the touch sensing region.

U.S. Pat. No. 4,144,449 to Funk et al. discloses one such system in which fluorescent light tubes arrayed on three sides of a rectangular touch sensing region emit light through narrow slits. Linear image detectors (e.g. CCDs) with 90° fields of view and positioned in the two corners opposing the fluorescent light tubes look for gaps in the bands of light emerging from the narrow slits. The location of a single contact area is determined by direct triangulation of the occluded portions of the field of view.

Figure 2:
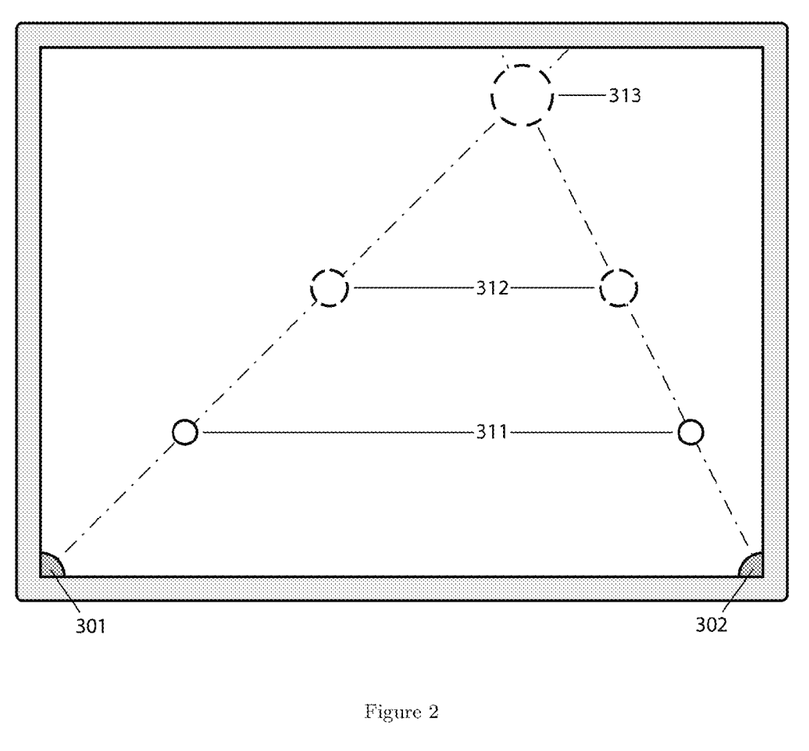
FIG. 2 shows illustrates the ambiguity that can arise with multiple, simultaneous contact areas within a touch sensing region.

However, direct triangulation is not easily extended to multiple, simultaneous contact areas. As shown in FIG. 2, ambiguity can arise. The system disclosed by Funk, relying on two detectors 301 and 302, cannot disambiguate the pair of contact areas 311 from the pair of contact areas 312 or the single contact area 313. The introduction of additional sensors can aid in resolving the particular ambiguity shown in FIG. 2, but problems still arise when one contact area occludes another contact area as viewed by one of the detectors.

SUMMARY

The invention determines the location of multiple, simultaneous contact areas on a touch sensing region using a light source and several light detectors. The invention is robust against occlusion and many of the ambiguities that can arise with multiple, simultaneous contact areas. Generally, the light source is positioned such that light emanating the light source passes across the touch sensing region, and the light detector are positioned such that at least a portion of the light source is within the field of view of each light detector. The contact areas are determined by identifying positive fans corresponding to an angular sector of the field of view of a light detector in which the view of the light source is occluded and negative fans corresponding to an angular sector of the field of view of a light detector in which the view of the light source is not occluded. The positive fans and negative fans are then additively and subtractively combined, respectively, to determine the contact areas.

DETAILED DESCRIPTION

The invention determines the location of multiple, simultaneous contact areas on a touch sensing region using a light source and several light detectors. The invention is robust against occlusion and many of the ambiguities that can arise with multiple, simultaneous contact areas.

Figure 3:
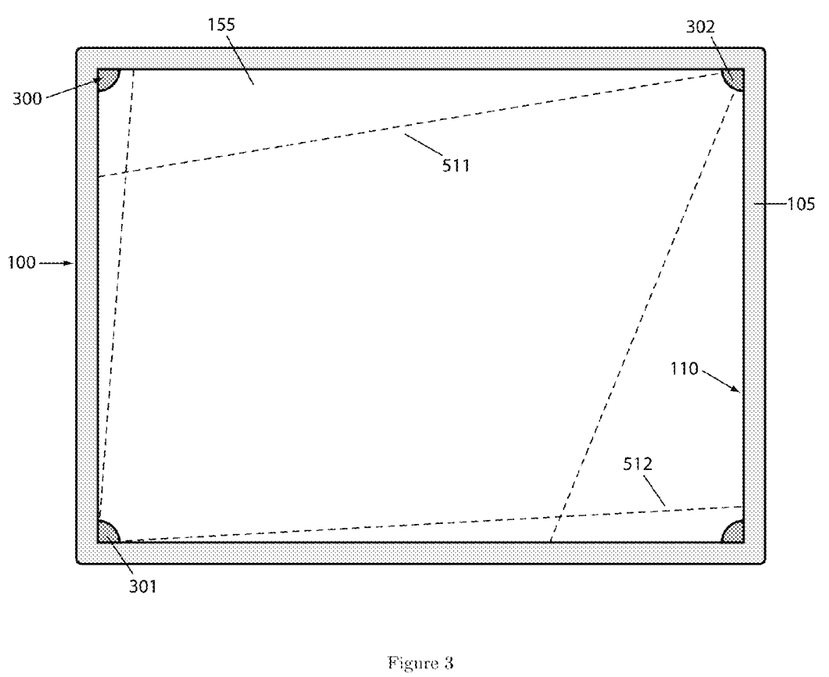
FIG. 3 shows an arrangement of light sources and light detectors on a touch-detecting interactive display according to the preferred embodiment of the invention.

FIG. 3 shows an arrangement of light sources and light detectors on a touch-detecting interactive display according to the preferred embodiment of the invention. Generally, the light source is positioned such that light emanating from the light source passes through the touch sensing region. For example, the light source may be positioned on the perimeter of the touch sensing region 155. In the preferred embodiment of FIG. 3, the light source is an array of infrared light-emitting diodes (LEDs) 110 recessed within the bezel 105 of the touch-detecting interactive display 100. The LEDs are preferably closely spaced and covered by a diffuser, providing a uniform strip of light along the perimeter of the touch sensing region. The infrared wavelength of the illumination ensures that the light source does not interfere with a user's view of any imagery displayed on the touch-detecting interactive display.

Generally, the light detectors 300 are positioned such that the at least a portion of the light source is within the field of view of each light detector. For example, the light detectors may also be positioned on the perimeter of the touch sensing region. In the case of the rectangular bezel of FIG. 3, light detectors 301 and 302 may be located at the corners of the rectangle. In the preferred embodiment of the invention, each light detector is a linear charge-coupled device (CCDs). Each linear CCD is oriented and fitted with optics providing a corresponding angular field of view 511 and 512 lying within a plane substantially parallel to the surface of the touch-detecting interactive display.

Defining the region of view of a light detector as the intersection of its field of view and the area within the bezel of the touch-detecting interactive display, the touch sensing region can be defined as the union of the region of views of all light detectors. In the case of the rectangular touch sensing region shown in FIG. 3, the angular extent of each field of view is preferably very nearly 90°. This ensures that the touch sensing region covers all or nearly all of the area within the bezel of the touch-detecting interactive display and that all points within the touch sensing region are within the region of view of at least two light detectors.

Figure 4:
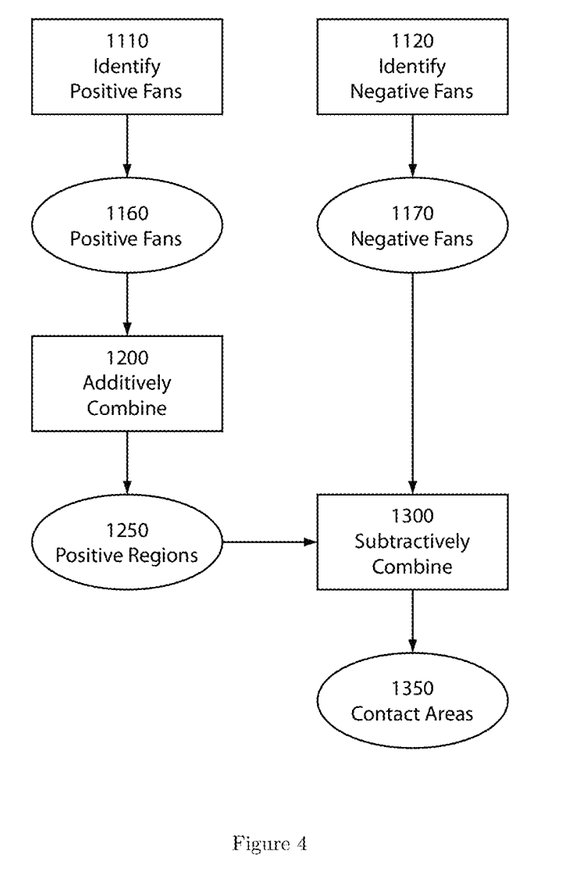
FIG. 4 shows a flow chart for determining contact areas within the touch sensing region according to the preferred embodiment of the invention.

FIG. 4 shows a flow chart for determining contact areas within the touch sensing region according to the preferred embodiment of the invention. Determination of the areas in which a user is contacting the touch sensing region begins by identifying positive fans 1110 and identifying negative fans 1120. A fan is a angular sector (i.e. an angular subset) of the field of view of a light detector. A fan can thus be defined by an origin (corresponding to the optical center of the light detector), a centerline (e.g. expressed as an angle relative to a baseline angle), and a angular width. A positive fan corresponds to an angular sector in which the light detector's view of the light source on the opposing portion of the touch sensing region perimeter is occluded. A negative fan corresponds to an angular sector in which the light detector's view of the light source is not occluded.

In the preferred embodiment of the invention, the positive fans and negative fans for each light detector are identified by analyzing the light intensity arriving at each element within the linear array of element within the linear CCD. The positive fans are those angular sectors corresponding to contiguous sets of elements measuring light intensity values below a threshold value. The negative fans are those angular sectors corresponding to contiguous sets of elements measuring light intensity values above a threshold value. For an individual light detector the positive fans and negative fans are thus disjoint, and the union of the positive fans and negative fans constitutes the portion of the field of view over which the light source provides illumination. That is, the positive fans and negative fans constitute the entire field of view but for any gaps in illumination associated with, for example, structural members in the bezel surrounding the display or other light detectors.

Determination of the areas in which a user is contacting the touch sensing region then proceeds by additively combing 1200 the positive fans 1160 to determine positive regions 1250. Next, subtractively combining 1300 the positive regions with the negative fans 1170 determines the contact areas 1350.

Figure 5:
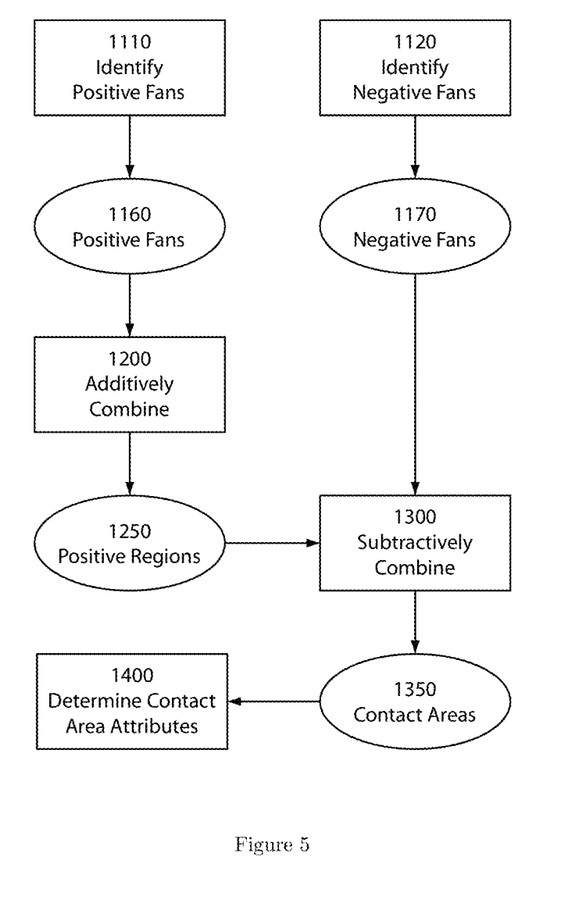
FIG. 5 shows a flow chart for determining contact areas within the touch sensing region and identifying attributes of the contact areas according to the preferred embodiment of the invention.

FIG. 5 shows a flow chart for determining contact areas within the touch sensing region and identifying attributes of the contact areas according to the preferred embodiment of the invention. The procedure illustrated in FIG. 4 optionally continues with determining contact area attributes 1400. For example, contiguous regions within the contact areas can be identified, and the centroids and extents of these regions determined.

In one embodiment of the invention, the additive and subtractive combination of the positive fans and negative fans described in FIG. 4 proceeds via pixel filling operations. Initially, a binary-valued pixel grid is established, with the extent of the pixel grid corresponding to the extent of the touch sensing region. All pixels within the pixel grid are set to a value of zero. Additive combination of the positive fans proceeds by, for each positive fan, intersecting the touch sensing region with the positive fan and establishing a perimeter around the resulting region. All pixels within the perimeter are set to a value of one. Upon completion of this operation for all positive fans, the positively valued pixels within the pixel grid represent the positive regions 1250 of FIG. 4. Subtractive combination of the negative fans proceeds by, for each negative fan, intersecting the touch sensing region with the negative fan and establishing a perimeter around the resulting region. All pixels within the perimeter are set to a value of zero. Upon completion of this operation for all negative fans, the positively valued pixels within the pixel grid represent the contact areas 1350 of FIG. 4.

As illustrated in FIG. 5, the procedure of FIG. 4 optionally continues with determining contact area attributes 1400. In the pixel filling approach described above, contiguous regions within the contact areas can be identified using connected component labeling. Specifically, 4-connected or 8-connected subsets of the positively valued pixels can be identified as distinct user touches within the touch sensing region. Additionally, a centroid, areal extent, and characteristic radius of each such touch can be computed.

In the preferred embodiment of the invention, the additive and subtractive combination of the positive fans and negative fans described in FIG. 4 proceeds via geometric intersection operations. Additive combination of the positive fans begins with the creation of an empty set of polygons G. Then, for a first positive fan in the set P of all identified positive fans 1160, the intersection with the other positive fans is determined in a pairwise manner. For each non-null intersection at least partly within the touch sensing region, a polygon representing the portion of the intersection within the touch sensing region is created in a set of polygons G'. The set of polygons G is then updated to be the union of G and G'. If the union operation results in one or more sets of overlapping polygons, each such set is replaced by a single polygon defined by the union of the overlapping polygons. The first positive fan is then removed from P, and the pairwise intersection is repeated for a second positive fan in the reduced set P. Pairwise intersection proceeds until there are no more positive fans in P. Optionally, after the update of the set of polygons G, a check is performed to ensure that each polygon in G is convex. For each concave polygon found in G, each vertex is considered for removal. A vertex is removed if and only if it is located in the interior of the polygon that would result were the vertex to be removed. Upon completion of the pairwise intersection of the positive fans, the set of polygons G represents the positive regions 1250 of FIG. 4.

Subtractive combination of the negative fans proceeds by intersecting each negative fan with the set of polygons G and cropping from each intersecting polygon the portion of the polygon that intersects the negative fan. Specifically, each polygon within G is searched for vertices that lie within the negative fan. Any vertices within the negative fan are removed from the polygon and replaced by vertices at the nearest locations (along the perimeter of the polygon) intersecting the edges of the negative fan. Upon completion of the cropping operation for all negative fans, the set of polygons G represents the contact areas 1350 of FIG. 4.

As illustrated in FIG. 5, the procedure of FIG. 4 optionally continues with determining contact area attributes 1400. In geometric intersection approach described above, the polygons within the set of polygons G can be identified as distinct user touches within the touch sensing region. Additionally, a centroid, areal extent, and characteristic radius of each such touch can be computed.

Figure 6:
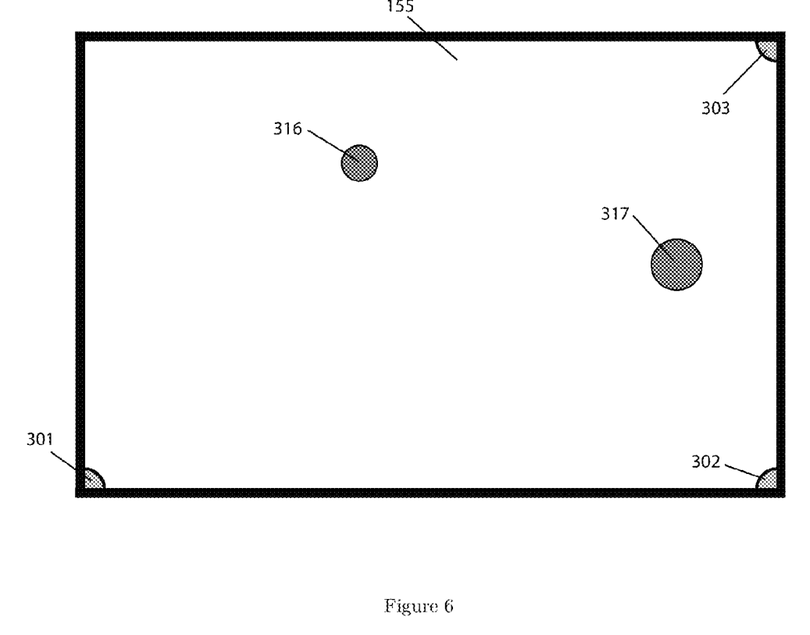
FIG. 6 shows an exemplary pair of physical contacts on a touch-detecting interactive display

The preferred embodiment of the invention is better understood by way of a detailed example. FIG. 6 shows an exemplary pair of physical contacts on a touch-detecting interactive display. The contacts 316 and 317 lie within the touch sensing region 155 of the touch-detecting interactive display, which is equipped with three light detectors 301, 302, and 303.

Figure 7:
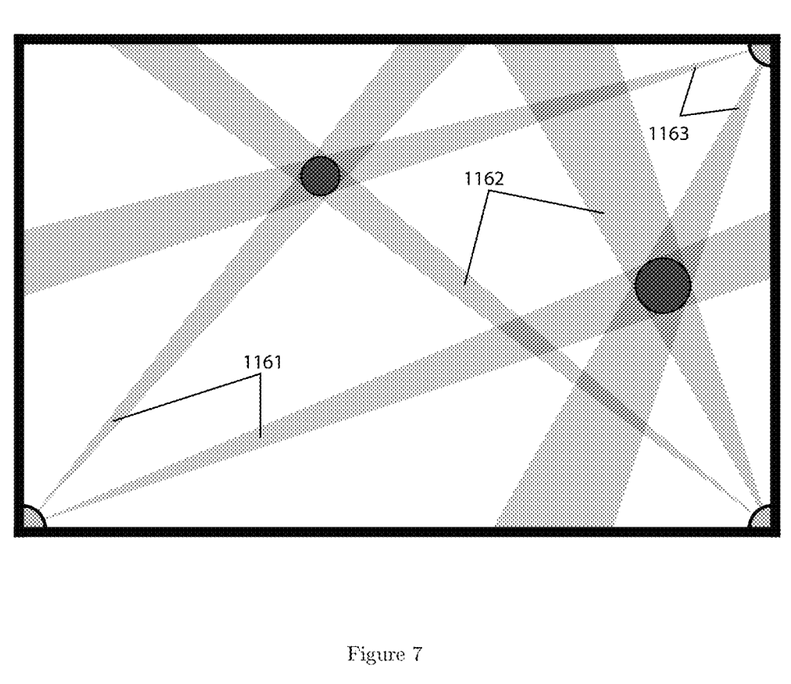
FIG. 7 shows a diagram of the positive fans for the contacts of FIG. 6, according to the preferred embodiment of the invention.

FIG. 7 shows a diagram of the positive fans for the contacts of FIG. 6, according to the preferred embodiment of the invention. The pairs (one for each contact) of positive fans 1161, 1162, and 1163 are associated with light detectors 301, 302, and 303, respectively.

Figure 8:
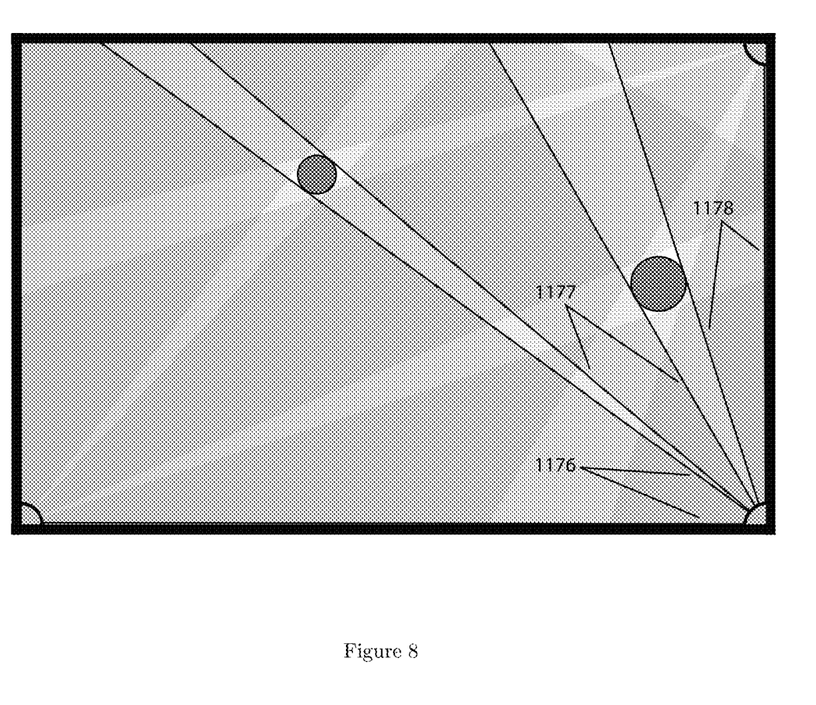
FIG. 8 shows a diagram of the negative fans for the contacts of FIG. 6, according to the preferred embodiment of the invention.

FIG. 8 shows a diagram of the negative fans for the contacts of FIG. 6, according to the preferred embodiment of the invention. The angular boundaries 1176, 1177, and 1178 of the negative fans associated with light detector 302 are outlined. For clarity, the negative fans associated with the other light detectors 301 and 303 are not outlined.

Figure 9:
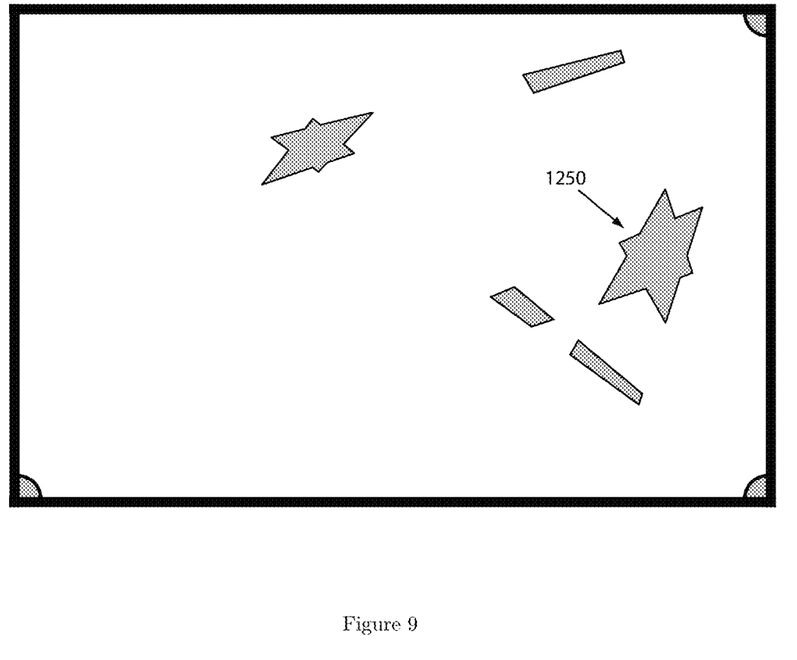
FIG. 9 shows a diagram of the positive regions for the contacts of FIG. 6, according to the preferred embodiment of the invention.

FIG. 9 shows a diagram of the positive regions for the contacts of FIG. 6, according to the preferred embodiment of the invention. The positive regions 1250 are the result of additively combining the positive fans of FIG. 7.

Figure 10:
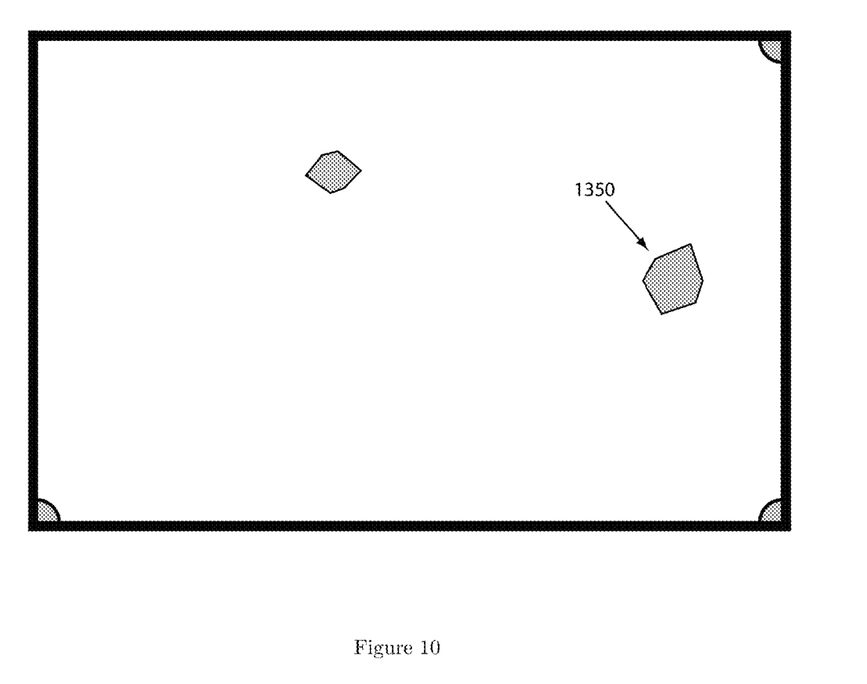
FIG. 10 shows a diagram of the contact areas for the contacts of FIG. 6, according to the preferred embodiment of the invention.

FIG. 10 shows a diagram of the contact areas for the contacts of FIG. 6, according to the preferred embodiment of the invention. The contact areas 1350 are the result of subtractively combing the negative fans of FIG. 8 with the positive regions of FIG. 9.

It should be noted that the procedure for determining contact areas described in FIG. 4 can be extended to any number of sensors positioned within or on the perimeter of the touch sensing region. Furthermore, while the invention is described with reference to an touch-detecting inter-active display in which the touch sensing region is substantially coincident with a display surface, the procedure can be used with touch sensing regions that are not associated with an interactive display.

Figure 11:
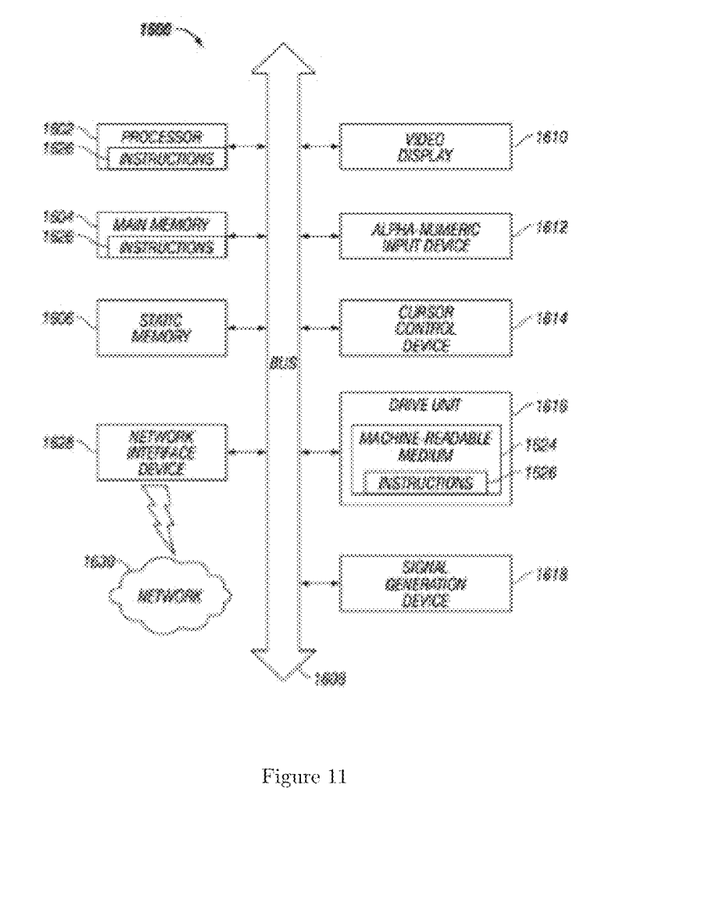
FIG. 11 is a block schematic diagram of a machine in the exemplary form of a computer system within which a set of instructions for causing the machine to perform any one of the foregoing methodologies may be executed.

FIG. 11 is a block schematic diagram of a machine in the exemplary form of a computer system within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following Claims.

The invention claimed is:

1. A computer implemented method of determining one or more contact areas within a touch sensing region comprising the steps of:
    positioning a light source such that light emanating from said light source passes across said touch sensing region;
    positioning a plurality of light detectors such that at least a portion of said light source is within the field of view of each of said plurality of light detectors;
    providing a processor configured to identify one or more positive fans, each of said positive fans corresponding to an angular sector of the field of view of one of said light detectors in which the view of the light source is occluded;
    said processor configured to identify one or more negative fans, each of said negative fans corresponding to an angular sector of the field of view of one of said light detectors in which the view of the light source is not occluded;
    said processor configured to additively combine said positive fans with one another to determine positive regions; and
    said processor configured to subtractively combine said negative fans with said positive regions to determine said contact areas.

2. The method of claim 1, additionally comprising the step of, after said subtractively combining step:
    determining one or more attributes of said contact areas.

3. The method of claim 2, wherein said one or more attributes comprise any of:
    a centroid,
    an areal extent, and
    a characteristic radius.

4. The method of claim 1, wherein said additively combining step and subtractively combining steps comprise pixel filling operations.

5. The method of claim 4, wherein said pixel filling operations comprise
    establishing a perimeter around the intersection of each of said positive fans and said touch sensing region and setting pixels within said perimeter to a non-zero value, and
    establishing a perimeter around the intersection of each of said positive fans and said touch sensing region and setting pixels within said perimeter to a zero value.

6. The method of claim 1, wherein said additively combining step and subtractively combining step comprise geometric intersection operations.

7. The method of claim 6,
    wherein said additively combining step comprises intersecting said positive fans to determine one or more polygons, and
    wherein said negatively combining step comprises cropping said polygons with said negative fans.

8. The method of claim 7, wherein said additively combing step additionally comprises ensuring that each of said polygons is convex.

9. The method of claim 1, wherein touch sensing region is substantially coincident with a display.

10. The method of claim 1, wherein said light source is positioned on a perimeter of said touch sensing region.

11. The method of claim 1, wherein said light detectors are positioned on a perimeter of said touch sensing region.

12. The method of claim 11, wherein said touch sensing region is a substantially rectangular region and each of said light detectors is positioned in a corner of said rectangular region.

13. The method of claim 1, wherein each of said light detectors is a linear CCD.

14. The method of claim 13, wherein
    said positive fans comprise those angular sectors corresponding to contiguous sets of elements within said linear CCD measuring light intensity values below a first threshold value, and
    said negative fans comprise those angular sectors corresponding to contiguous sets of elements within said linear CCD measuring light intensity values above a second threshold value.

15. The method of claim 14, wherein said first threshold value and said second threshold value are identical.

16. The method of claim 14, wherein said first threshold value and said second threshold value are different.

17. The method of claim 1, wherein said light source comprises LEDs.

18. The method of claim 17, wherein said light source additionally comprises a diffuser located between said LEDs and said touch sensing region.

19. The method of claim 17, wherein said LEDs are infrared LEDs.

20. A computer readable storage medium having stored therein program instructions which, when executed by a processor, implement the method of claim 1.

21. An apparatus for determining one or more contact areas within a touch sensing region, comprising:
    a light source positioned such that light emanating from said light source passes across said touch sensing region;
    a plurality of light detectors positioned such that at least a portion of said light source is within the field of view of each of said plurality of light detectors;
    a processor configured to identify one or more positive fans, each of said positive fans corresponding to an angular sector of the field of view of one of said light detectors in which the view of the light source is occluded;

said processor configured to identify one or more negative fans, each of said negative fans corresponding to an angular sector of the field of view of one of said light detectors in which the view of the light source is not occluded;

said processor configured to additively combine said positive fans with one another to determine positive regions; and said processor configured to subtractively combine said negative fans with said positive regions to determine said contact areas.

\* \* \* \* \*